US012499469B2

(12) United States Patent
Pandillapalli et al.

(10) Patent No.: US 12,499,469 B2
(45) Date of Patent: Dec. 16, 2025

(54) DATA ANALYSIS TO DETERMINE OFFERS MADE TO CREDIT CARD CUSTOMERS

(71) Applicant: Mastercard International Incorporated, Purchase, NY (US)

(72) Inventors: Bhargav Pandillapalli, Gurgaon (IN); Yatin Katyal, Rohtak (IN); Karamjit Singh, Gurugram (IN); Sangam Verma, Gurugram (IN); Tanmoy Bhowmik, Bangalore (IN)

(73) Assignee: Mastercard International Incorporated, Purchase, NY (US)

( * ) Notice: Subject to any disclaimer, the term of this patent is extended or adjusted under 35 U.S.C. 154(b) by 72 days.

(21) Appl. No.: 17/461,508

(22) Filed: Aug. 30, 2021

(65) Prior Publication Data
US 2023/0063333 A1    Mar. 2, 2023

(51) Int. Cl.
*G06Q 30/00*     (2023.01)
*G06N 20/00*     (2019.01)
*G06Q 30/0201*   (2023.01)
*G06Q 30/0251*   (2023.01)

(52) U.S. Cl.
CPC ......... *G06Q 30/0255* (2013.01); *G06N 20/00* (2019.01); *G06Q 30/0201* (2013.01)

(58) Field of Classification Search
CPC . G06Q 30/0255; G06Q 30/0201; G06N 20/00
See application file for complete search history.

(56) References Cited

U.S. PATENT DOCUMENTS

| 6,226,408 B1 * | 5/2001 | Sirosh | G06K 9/6224 |
| | | | 382/253 |
| 2008/0162258 A1 * | 7/2008 | Kala | G06Q 30/0224 |
| | | | 705/7.33 |
| 2009/0132347 A1 * | 5/2009 | Anderson | G06Q 30/02 |
| | | | 705/30 |

FOREIGN PATENT DOCUMENTS

| WO | WO-2008021056 A2 * | 2/2008 | G06Q 30/02 |
| WO | WO-2014134180 A2 * | 9/2014 | G06Q 20/105 |

OTHER PUBLICATIONS

Alliance., Smart Cards and the Retail Payments Infrastructure: Status, Drivers, and Directions, https://www.it.iitb.ac.in/~tijo/seminar/Infrastructure_White_Paper.pdf, Smart Card Alliance (Year: 2002).*

* cited by examiner

*Primary Examiner* — Patricia H Munson
*Assistant Examiner* — Uche Byrd
(74) *Attorney, Agent, or Firm* — Hovey Williams LLP (57) ABSTRACT

A computing device for analyzing data from user spending patterns to determine offers to be presented to credit card customers comprises a processing element configured to: receive transaction data for a plurality of transactions for each of a plurality of credit card numbers; input the transaction data into an encoder that performs linear transformations and nonlinear transformations to produce latent space data with each latent space data point being associated with one credit card number; input the latent space data into a clustering element which associates each credit card number with one of a plurality of clusters; and make an upgrade offer to credit card numbers that have a normal credit status and which are associated with clusters that include credit card numbers that have a preferred credit status.

3 Claims, 4 Drawing Sheets

DATA ANALYSIS TO DETERMINE OFFERS MADE TO CREDIT CARD CUSTOMERS

FIELD OF THE INVENTION

Embodiments of the current invention relate to analyzing data from user spending patterns to determine offers to be presented to credit card customers.

BACKGROUND

Credit card companies often desire to make offers to their customers to reward card usage. The offers may include an increase in a customer's credit limit or an upgrade to a credit card with different features, lower fees, etc. Typically, credit card companies have hundreds of thousands or millions of customers, meaning companies often utilize computer analyses of large data sets to identify customers eligible for upgrade offers. Such analyses are, however, often slow and/or inaccurate according to existing methods.

SUMMARY OF THE INVENTION

Embodiments of the current invention address one or more of the above-mentioned problems and provide a distinct advance in the art of determining when to offer a credit card customer an upgrade to a credit card with different features, lower fees, etc. Specifically, embodiments of the current invention may provide a computing device that performs both linear and nonlinear transforms on credit card transaction data in order to reduce the dimensionality of the data. The computing device then applies a K-means clustering algorithm to determine whether to make an upgrade offer to the credit card customer. This approach is effective when the relationships between the transaction data variables are linear, nonlinear, or both.

The computing device broadly comprises a processing element configured to receive transaction data for a plurality of transactions for each of a plurality of credit card numbers; input the transaction data into an encoder that performs linear transformations and nonlinear transformations to produce latent space data with each latent space data point being associated with one credit card number; input the latent space data into a clustering element which associates each credit card number with one of a plurality of clusters; and make an upgrade offer to credit card numbers that have a normal credit status which are associated with clusters that include credit card numbers that have a preferred credit status.

Other embodiments of the current invention provide a computer-implemented method for analyzing data from user spending patterns to determine offers to be presented to credit card customers, wherein the method comprises receiving transaction data for a plurality of transactions for each of a plurality of credit card numbers; inputting the transaction data into an encoder that performs linear transformations and nonlinear transformations to produce latent space data with each latent space data point being associated with one credit card number; inputting the latent space data into a clustering element which associates each credit card number with one of a plurality of clusters; and making an upgrade offer to credit card numbers that have a normal credit status which are associated with clusters that include credit card numbers that have a preferred credit status.

Yet other embodiments of the current invention provide a non-transitory computer readable medium having stored thereon software instructions for analyzing data from user spending patterns to determine offers to be presented to credit card customers that, when executed by a processing element, cause the processing element to: receive transaction data for a plurality of transactions for each of a plurality of credit card numbers; input the transaction data into an encoder that performs linear transformations and nonlinear transformations to produce latent space data with each latent space data point being associated with one credit card number; input the latent space data into a clustering element which associates each credit card number with one of a plurality of clusters; and make an upgrade offer to credit card numbers that have a normal credit status which are associated with clusters that include credit card numbers that have a preferred credit status.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense.

The scope of the current invention is defined only by the appended claims, along with the full scope of equivalents to which such claims are entitled.

Figure 1:
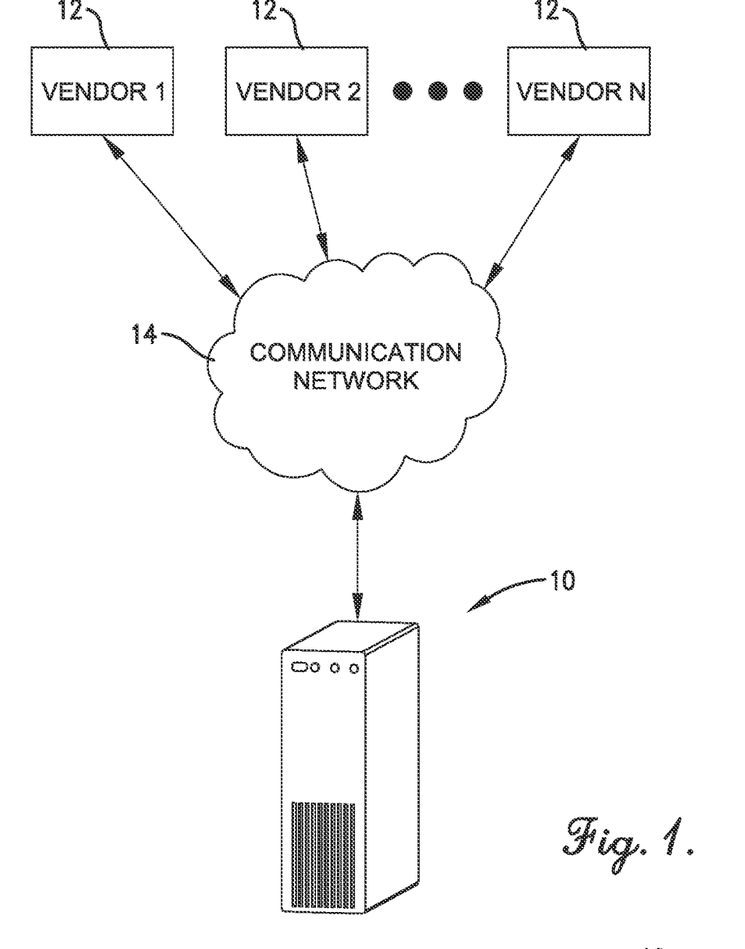
FIG. 1 is an environmental view of a computing device, constructed in accordance with various embodiments of the invention, for analyzing data from user spending patterns to determine offers to be presented to credit card customers wherein the computing device receives data from a plurality of vendors through a communication network.

A computing device 10, constructed in accordance with various embodiments of the current invention, for analyzing data from user spending patterns to determine offers to be presented to credit card customers is shown in FIG. 1. The offers may include an increase in a credit amount or an upgrade of credit card type or features. A credit card customer is anyone having a credit line or credit account with a credit card company. The computing device 10 generally receives transaction data from a plurality of vendors 12 through a communication network 14. The vendors 12 may include any entity which sells goods and/or services to credit card customers who have paid with a credit card. Examples of vendors 12 include online retailers and entities operating brick and mortar stores, shops, boutiques, repair centers, and/or the like. The transaction data may include data identifying the vendor 12, a type or industry of the vendor 12, items or types of items that were sold, services that were sold, a location of the sale, a date and time of the sale, and so forth for each transaction for each credit card or credit card number. Thus, the transaction data includes a plurality of transactions associated with each credit card number, and may incorporate thousands or tens of thousands of credit card numbers.

The communication network 14 generally allows communication between the vendors 12 and the computing device 10. The communication network 14 may include local area networks, metro area networks, wide area networks, cloud networks, the Internet, and the like, or combinations thereof. The communication network 14 may be wired, wireless, or combinations thereof and may include components such as switches, routers, hubs, access points, and the like. The computing device 10 may connect to the communication network 14 either through wires, such as electrical cables or fiber optic cables, or wirelessly, such as radio frequency (RF) communication using wireless standards such as Bluetooth® or the Institute of Electrical and Electronic Engineers (IEEE) 802.11 including WiFi and the like.

Figure 2:
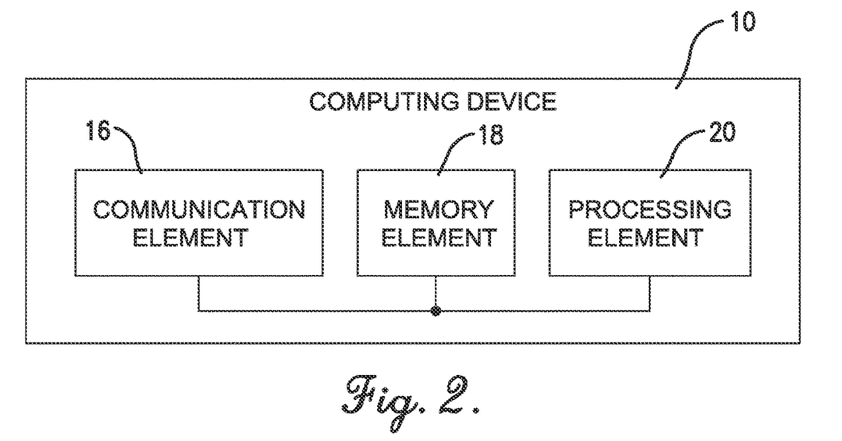
FIG. 2 is a schematic block diagram of various electronic components of the computing device.

The computing device 10 may be embodied by one or more servers, such as application servers, database servers, file servers, or combinations thereof, or by one or more workstation computers, desktop computers, or the like. Referring to FIG. 2, the computing device 10 includes a communication element 16, a memory element 18, and a processing element 20.

The communication element 16 generally allows the computing device 10 to communicate with other computing devices, external systems, networks, and the like. The communication element 16 may include signal and/or data transmitting and receiving circuits, such as antennas, amplifiers, filters, mixers, oscillators, digital signal processors (DSPs), and the like. The communication element 16 may establish communication wirelessly by utilizing radio frequency (RF) signals and/or data that comply with communication standards such as cellular 2G, 3G, 4G, Voice over Internet Protocol (VoIP), LTE, Voice over LTE (VoLTE), or 5G, Institute of Electrical and Electronics Engineers (IEEE) 802.11 standard such as WiFi, IEEE 802.16 standard such as WiMAX, Bluetooth™, or combinations thereof. In addition, the communication element 16 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 16 may establish communication through connectors or couplers that receive metal conductor wires or cables which are compatible with networking technologies such as ethernet. In certain embodiments, the communication element 16 may also couple with optical fiber cables. The communication element 16 may be in electronic communication with the memory element 18 and the processing element 20.

The memory element 18 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 18 may be embedded in, or packaged in the same package as, the processing element 20. The memory element 18 may include, or may constitute, a non-transitory "computer-readable medium". The memory element 18 may store the instructions, code, code statements, code segments, software, firmware, programs, applications, apps, services, daemons, or the like that are executed by the processing element 20. The memory element 18 may also store data that is received by the processing element 20 or the device in which the processing element 20 is implemented. The processing element 20 may further store data or intermediate results generated during processing, calculations, and/or computations as well as data or final results after processing, calculations, and/or computations. In addition, the memory element 18 may store settings, data, documents, sound files, photographs, movies, images, databases, and the like.

The processing element 20 may comprise one or more processors. The processing element 20 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 20 may include digital processing unit (s). The processing element 20 may generally execute, process, or run instructions, code, code segments, code statements, software, firmware, programs, applications, apps, processes, services, daemons, or the like. The processing element 20 may also include hardware components such as registers, finite-state machines, sequential and combinational logic, configurable logic blocks, and other electronic circuits that can perform the functions necessary for the operation of the current invention. In certain embodiments, the processing element 20 may include multiple computational components and functional blocks that are packaged separately but function as a single unit. The processing element 20 may be in electronic communication with the communication element 16 and the memory element 18 through serial or parallel links that include universal busses, address busses, data busses, control lines, and the like.

The processing element 20 may be operable, configured, or programmed to perform the following functions by utilizing hardware, software, firmware, or combinations thereof. The processing element 20, through the communication element 16, receives the data on credit card transactions from the vendors. All of the data regarding each transaction, such as date and time of transaction, industry, etc., is linked to a credit card number that initiated the transaction, and there may be thousands or tens of thousands of credit card numbers. The processing element 20 may sort, group, or arrange the data, or portions of the transaction data, so that the transactions that occurred during a particular time period, such as three months prior, six months prior, etc., are grouped together. Additionally, or alternatively, transactions that occurred from a particular industry, such as grocery, transportation, etc., are grouped together. Other filtering, groupings and/or arrangements of the data are also possible.

Figure 3:
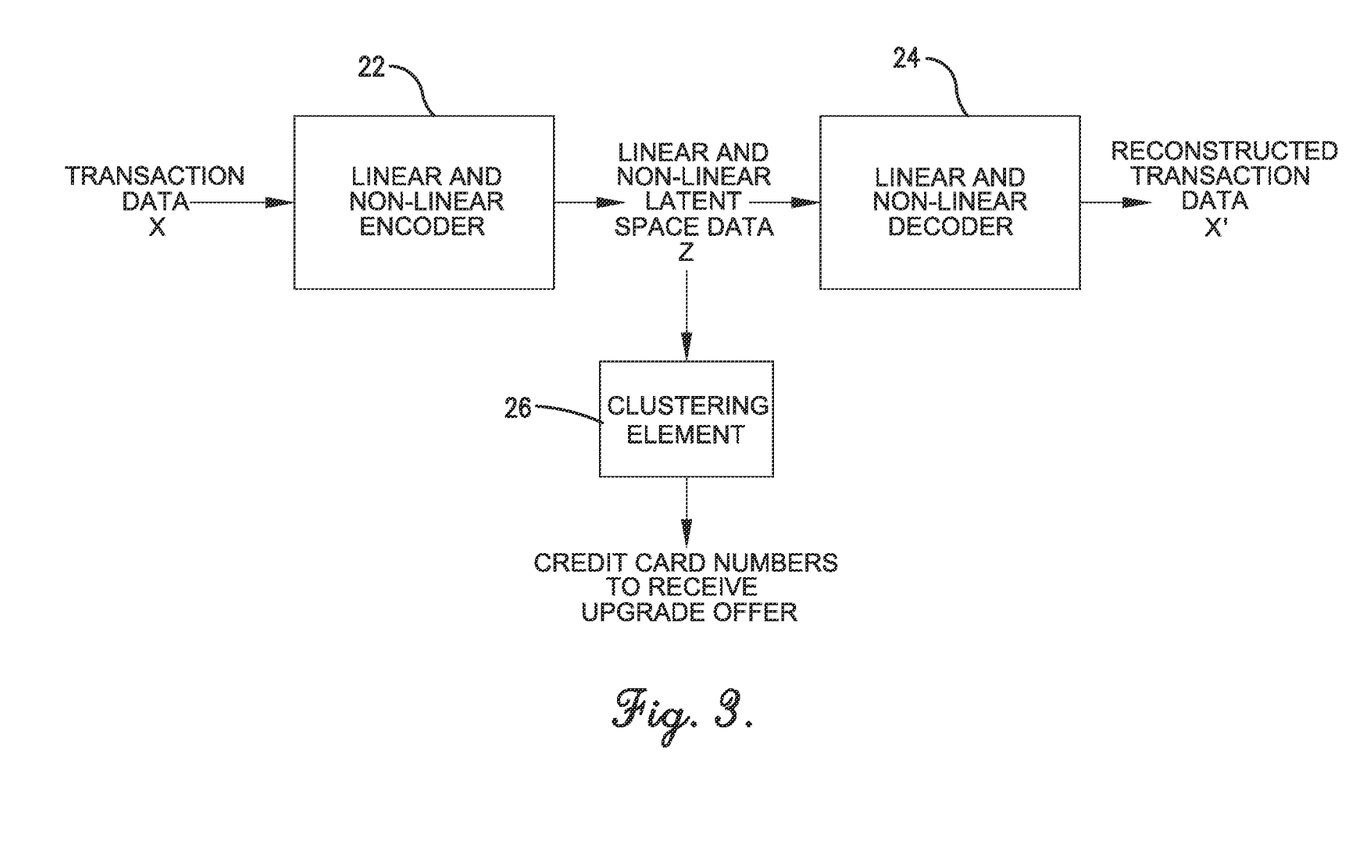
FIG. 3 is a schematic flow diagram of various software components which are executed on the computing device in accordance with various embodiments of the present invention.

Unsupervised machine learning techniques, such as clustering in general, or K-means clustering in particular, may be used to determine which credit card numbers should be presented with an offer. However, given the large volume of the transaction data and the large number of variables, also known as the "dimensionality" of the data, K-means clustering is difficult or impossible to perform on the data. In order to perform K-means clustering, the dimensionality may be reduced according to embodiments of the present invention. Dimensionality reduction may be performed by transforming the data from normal space to latent space. The transformation may be performed by techniques such as principal component analysis (PCA), canonical correlation analysis (CCA), nonnegative matrix factorization (NMF), and sparse coding (dictionary learning). An exemplary transformation may be performed by an encoder 22. Thus, as shown in FIG. 3, the processing element 20 inputs the transaction data, shown as x, into the encoder 22, which uses an artificial neural network (ANN) to apply an encoding algorithm to the data. The ANN typically includes a plurality of layers extending from an input to an output. Each layer from input to output includes a successively decreasing number of nodes. The encoder 22 provides a linear transformation of the transaction data as well as a non-linear transformation of the transaction data. The linear transformation may involve calculations that use the following equation:

$$h = \sigma(Wx+b) \qquad \text{EQ. 1}$$

wherein h is the linear latent space data, σ is an element-wise activation function such as a sigmoid function or a rectified linear unit, W is a weight matrix, b is a bias vector, and x is the transaction data. The nonlinear transformation may involve applying a nonlinear function, f(xi), to the transaction data, wherein the nonlinear function may be exponential, logarithmic, quadratic, etc. The linear calculation and the nonlinear calculation are performed at each node of the ANN. The output of the ANN and the encoder 22 is the latent space data Z which includes the data produced from the linear transformation concatenated with the data produced from the nonlinear transformation. The encoder 22 compresses the transaction data so that the latent space data Z is smaller in size and has reduced dimensionality.

Accompanying the encoder 22 is a decoder 24, which attempts to reconstruct the original transaction data, as closely as possible, from the latent space data Z by applying a decoding algorithm to the data. The reconstructed transaction data is shown as x' in FIG. 3. The decoder 24 also includes an ANN with a structure that is at least in part a rough approximation of a mirror image of the encoder 22, in that the ANN of the decoder 24 includes a plurality of layers and a plurality of nodes with each layer from input to output including a successively increasing number of nodes. The decoder 24 also provides a linear transformation of the latent space data as well as a non-linear transformation of the latent space data. The linear transformation may involve calculations that use the following equation:

$$x' = \sigma'(W'h+b') \qquad \text{EQ. 2}$$

wherein x' is the reconstructed transaction data, h is the linear latent space data, and σ', W', and b' provide the same function as the unprimed variables discussed above for the encoder 22, but have different values in the decoder 24. The nonlinear transformation may involve applying a nonlinear function, g(f(xi)), to the nonlinear latent space data, wherein the nonlinear function may be an inverse of the nonlinear function f(xi). The processing element 20 inputs the latent space data Z into the decoder 24 to produce the reconstructed transaction data x'. The decoder 24 expands the latent space data Z and increases its dimensionality to reconstruct the transaction data x'.

Figure 4:
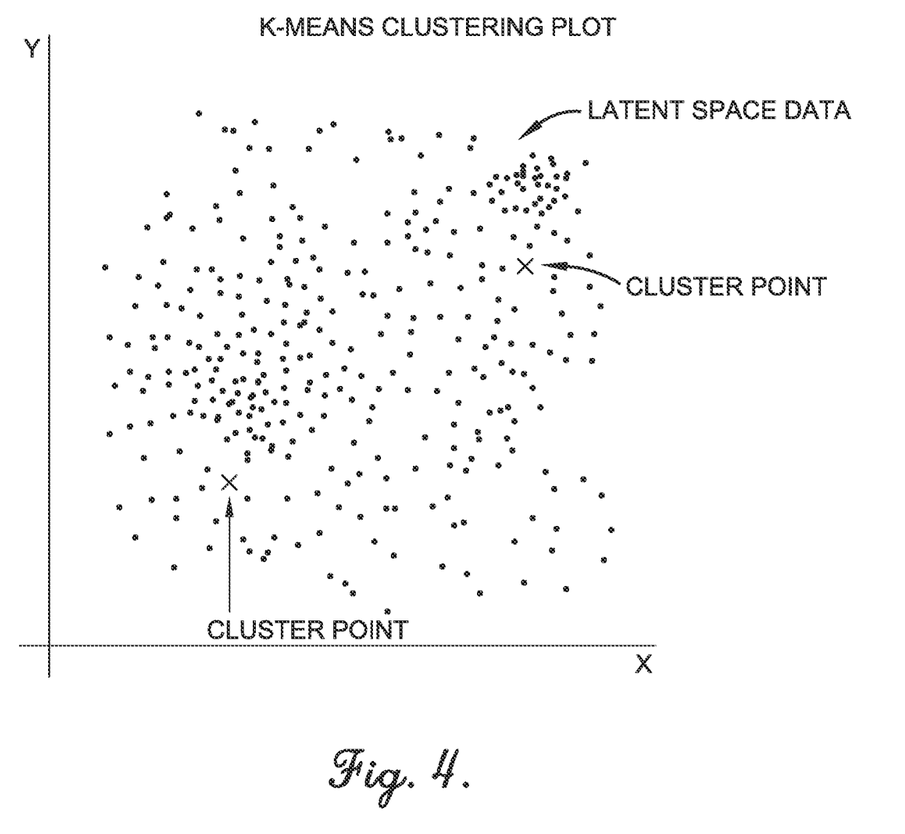
FIG. 4 is a plot of latent space data during K-means clustering.

As mentioned above, the processing element 20 implements a K-means clustering algorithm on the latent space data Z with a clustering element 26. Referring to FIG. 4, the K-means clustering algorithm creates a virtual plot of the latent space data Z in a two-dimensional plot or a three-dimensional plot, wherein each point shown as a dot in the plot represents a credit card number. The algorithm creates a plurality of cluster points, shown as an "X" in FIG. 4, that are distributed throughout the plot of the latent space data points. The number of cluster points may be chosen by applying a secondary algorithm or other criteria. The number of cluster points may vary according to the type of information to be gleaned from the data. Exemplary embodiments may include at least two cluster points, with a first cluster point indicating credit card numbers that should receive an upgrade offer and a second cluster point indicating credit card numbers that should not receive an upgrade offer. The algorithm determines for each data point which cluster point it is closest to. Thus, each cluster point has a cluster, or group, of data points for which it is the closest cluster point. In an iterative process, the algorithm moves the location of each cluster point to minimize the distance between the cluster point and each of the data points which belong to the cluster—the distance being known as the "clustering loss". After the location of the cluster point is moved, some data points may be no longer associated with their previous cluster and may be newly associated with a different cluster. The algorithm stops when the aggregate clustering loss is minimized or when the cluster points are no longer moved by a significant distance.

In general, the processing element 20 trains the encoder 22 and the decoder 24 and implements the clustering element 26 to minimize losses that occur during both transaction data reconstruction and clustering. Training of the encoder 22 and decoder 24 may, among other actions, modify the weights of the nodes in the encoder 22 and decoder 24. Specifically, the processing element 20 minimizes the losses included in the following equation, EQ. 3:

$$\min\left(\sum\nolimits_{i1}^{N}(l(g(f(x_i)), x_i) + \|X - WH\|) + \sum\nolimits_{i1}^{m}\frac{\lambda}{2}\|\mu(x_i) - M_{S_i}\|_2^2 + r1(H) + r2(W)\right)$$

wherein l(g(f(xi)), xi) is the reconstruction, or transformation, loss of the nonlinear function, X−WH is the reconstruction, or transformation, loss of the linear function, and r1(H) and r2(W) are regularizing terms that avoid a trivial solution when minimizing the above equation. μ(xi)−Msi is the clustering loss, wherein −(xi) is the concatenation of f(xi) and H, which represent the nonlinear data and the linear data, respectively, after transformation through the encoder 22.

The computing device 10 may operate as follows. Through the communication element 16, the processing element 20 receives transaction data regarding a plurality of transactions for each of a plurality of credit card numbers. Referring to FIG. 3, the processing element 20 inputs the transaction data x into the encoder 22, which performs both linear and nonlinear transformations on the transaction data to produce latent space data Z. The processing element 20 inputs the latent space data Z into the decoder 24, which performs both linear and nonlinear reconstruction to produce reconstructed transaction data x'. The processing element 20 inputs the latent space data Z into the clustering element 26, which performs clustering (e.g., K-means clustering) on the latent space data Z. The processing element 20 trains the encoder 22 and the decoder 24 and implements the clustering element 26 to minimize losses that occur during both transaction data reconstruction and clustering. The data points which are input into the clustering element 26 represent credit card numbers, and are located within the virtual plot according to a reduced dimensionality representation (e.g., a vector) of the original high dimensionality transaction data. Each credit card number data point is associated with one of a plurality of cluster points, or is considered to be in one of a plurality of clusters. As the cluster points are moved around to minimize the clustering loss, the data points may change the cluster to which they belong. After the loss is minimized and the cluster points are fixed to a particular location, then each data point, corresponding to a credit card number, is associated with a particular cluster. Characteristics, such as credit limit or type of card (e.g., normal), preferred levels including silver, gold, platinum, etc., are known about each credit card number. The processing element 20 determines for each credit card number which cluster it was assigned to during the clustering processes outlined above. The cluster, or clusters, that included a majority of high credit limit or preferred type credit card numbers are considered preferred cluster(s). If a credit card number with a lower credit limit or normal type of card is in one of the preferred clusters, then the credit card number is scheduled to receive an offer to have an increased credit limit or a preferred status. For example, according to various embodiments of the current invention, a credit card number may be associated with a lower credit limit and normal credit status, but the credit card number may be used to make large purchases that are more typical of the spending patterns of a credit card number that is associated with a higher credit limit and preferred credit status. Most likely, this normal credit status credit card number will end up being plotted during the K-means clustering algorithm in the vicinity of a plurality of preferred credit status credit card numbers such that the normal credit status credit card number will be included in the same cluster as the preferred credit status credit card numbers. In this situation, the normal credit status credit card number will be offered an upgrade to become preferred credit status, if desired.

Figure 5:
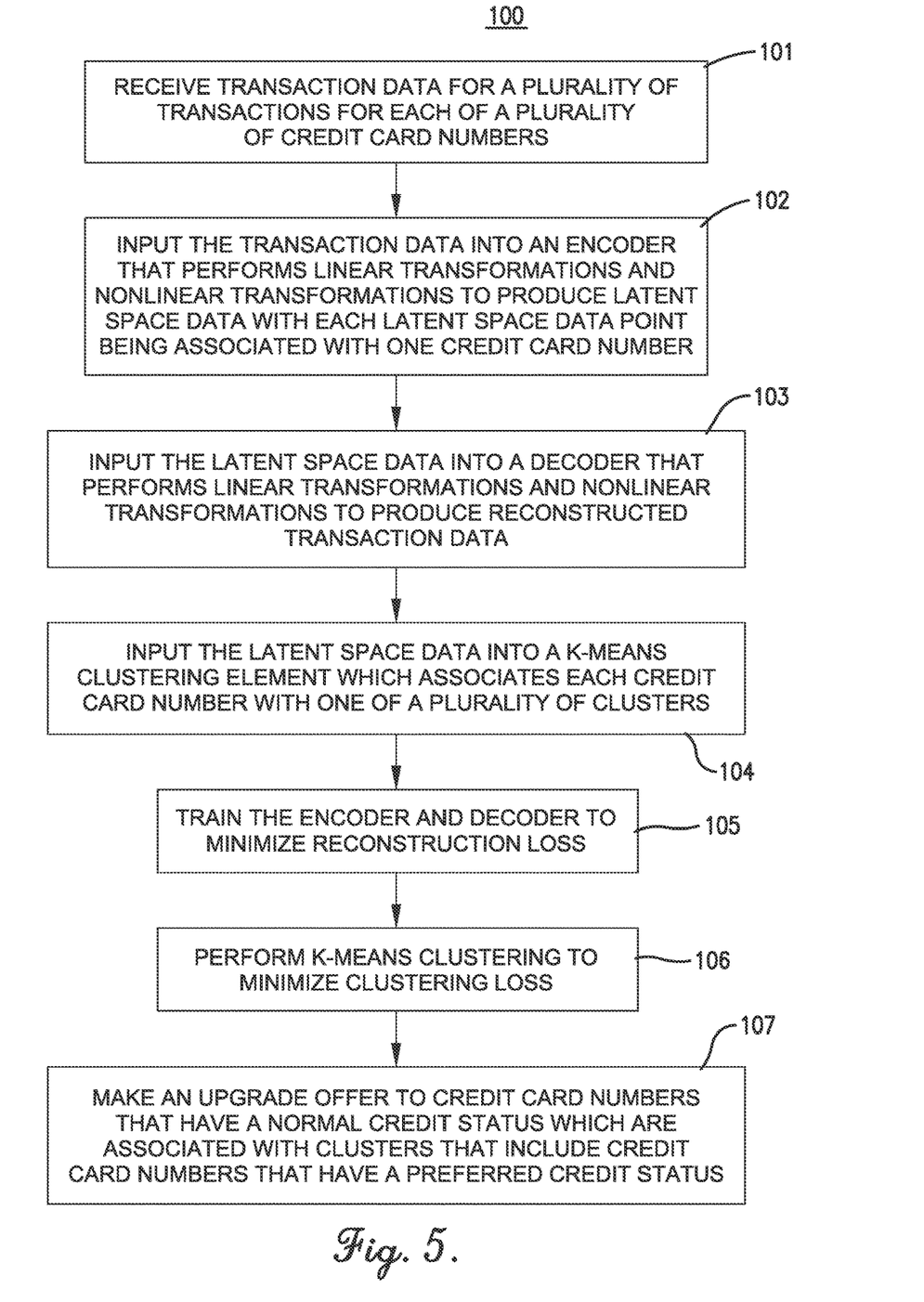
FIG. 5 is a flow diagram of at least a portion of the steps of a method for analyzing data from user spending patterns to determine offers to be presented to credit card customers in accordance with various embodiments of the present invention.

FIG. 5 depicts a listing of at least a portion of the steps of an exemplary computer-implemented method 100 for analyzing data from user spending patterns to determine offers to be presented to credit card customers. The steps may be performed in the order shown in FIG. 5, or they may be performed in a different order. Furthermore, some steps may be performed concurrently as opposed to sequentially. In addition, some steps may be optional or may not be performed. The steps may be performed by the processing element 20 of the computing device 10 via hardware, software, firmware, or combinations thereof. Furthermore, the steps may be implemented as instructions, code, code segments, code statements, a program, an application, an app, a process, a service, a daemon, or the like, and may be stored on a computer-readable storage medium, such as the memory element 18.

Referring to step 101, transaction data for a plurality of transactions for each of a plurality of credit card numbers is received from a plurality of vendors. All of the data regarding each transaction, such as date and time of transaction, industry, etc., is linked to a credit card number that initiated the transaction, and there may be thousands or tens of thousands of credit card numbers. The processing element 20 may sort, group, or arrange the data, or portions of the transaction data, so that the transactions that occurred during a particular time period, such as three months prior, six months prior, etc., are grouped together. Additionally, or alternatively, transactions that occurred from a particular industry, such as grocery, transportation, etc., are grouped together. Other groupings or arrangements of the data are also possible. Moreover, it is foreseen that such grouping or arrangement operations may be omitted without departing from the spirit of the present invention.

Referring to step 102, the transaction data is input into an encoder 22 that performs linear transformations and nonlinear transformations to produce latent space data, with each latent space data point being associated with one credit card number. As shown in FIG. 3, the processing element 20 inputs the transaction data, shown as x, into the encoder 22, which uses an artificial neural network (ANN) to apply an encoding algorithm to the data. The ANN typically includes a plurality of layers extending from an input to an output. Each layer from input to output includes a successively decreasing number of nodes. The encoder 22 provides a linear transformation of the transaction data as well as a non-linear transformation of the transaction data. The linear transformation may involve calculations that use EQ. 1. The nonlinear transformation may involve applying a nonlinear function, $f(x_i)$, to the transaction data, wherein the nonlinear function may be exponential, logarithmic, quadratic, etc. The linear calculation and the nonlinear calculation are performed at each node of the ANN. The output of the ANN and the encoder 22 is the latent space data Z which includes the data produced from the linear transformation concatenated with the data produced from the nonlinear transformation. The encoder 22 compresses the transaction data so that the latent space data Z is smaller in size and has reduced dimensionality.

Referring to step 103, the latent space data is input into a decoder 24 that performs linear transformations and nonlinear transformations to produce reconstructed transaction data. The decoder 24 applies a decoding algorithm to the data. The reconstructed transaction data is shown as x' in FIG. 3. The decoder 24 also includes an ANN with a structure that is at least in part a rough approximation of a mirror image of the encoder 22 in that the ANN of the decoder 24 includes a plurality of layers and a plurality of nodes with each layer from input to output including a successively increasing number of nodes. The decoder 24 also provides a linear transformation of the latent space data as well as a non-linear transformation of the latent space data. The linear transformation may involve calculations that use EQ. 2. The nonlinear transformation may involve applying a nonlinear function, $g(f(x_i))$, to the nonlinear latent space data, wherein the nonlinear function may be an inverse of the nonlinear function $f(x_i)$. The processing element 20 inputs the latent space data Z into the decoder 24 to produce the reconstructed transaction data x'. The decoder 24 expands the latent space data Z and increases its dimensionality to reconstruct the transaction data x'.

Referring to step 104, the latent space data is input into a clustering element 26 which associates each credit card number with one of a plurality of clusters. Referring to FIG. 4, the clustering element 26 executes a K-means clustering algorithm that creates a virtual plot of the latent space data Z in a two-dimensional plot or a three-dimensional plot, wherein each point shown as a dot in the plot represents a credit card number. The algorithm creates a plurality of cluster points, shown as an "X" in FIG. 4, that are distributed throughout the plot of the latent space data points. The number of cluster points may be chosen by applying a secondary algorithm or other criteria. The number of cluster points may vary according to the type of information to be gleaned from the data. Exemplary embodiments may include at least two cluster points, with a first cluster point indicating credit card numbers that should receive an upgrade offer and a second cluster point indicating credit card numbers that should not receive an upgrade offer.

Referring to step 105, the encoder and decoder are trained to minimize reconstruction loss. Training of the encoder 22 and decoder 24 may, among other actions, modify the weights of the nodes in the encoder 22 and decoder 24. Specifically, the processing element 20 minimizes the losses included in EQ. 3.

Referring to step 106, clustering, such as K-means clustering is performed to minimize clustering loss. The K-means clustering algorithm determines for each data point which cluster point it is closest to. Thus, each cluster point has a cluster, or group, of data points for which it is the closest cluster point. In an iterative process, the algorithm moves the location of each cluster point to minimize the distance between the cluster point and each of the data points which belong to the cluster—the distance being known as the "clustering loss". After the location of the cluster point is moved, some data points may be no longer associated with their previous cluster and may be newly associated with a different cluster. The algorithm stops when the aggregate clustering loss is minimized or when the cluster points are no longer moved by a significant distance.

Referring to step 107, an upgrade offer is made to credit card numbers that have a normal credit status which are associated with clusters that include credit card numbers that have a preferred credit status. Preferred credit status for a credit card number includes characteristics or features such as a relatively high credit limit or preferred levels including silver, gold, platinum, etc. During execution of the K-means clustering algorithm before the loss is minimized, and as the cluster points are moved around to minimize the clustering loss, the data points may change the cluster to which they belong. After the loss is minimized and the cluster points are fixed to a particular location, then each data point, i.e., credit card number, is associated with a particular cluster. The processing element 20 determines for each credit card number which cluster it belonged to. The cluster, or clusters, that included a majority of high credit limit or preferred type credit card numbers are considered preferred clusters. If a credit card number with a lower credit limit or normal type of card is in one of the preferred clusters, then credit card number is scheduled to receive an offer to have an increased credit limit or a preferred status.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A computing device for analyzing data from user spending patterns to determine offers to be presented to credit card customers, the computing device comprising:
   a processing element programmed or configured to:
      receive transaction data for a plurality of transactions for each of a plurality of credit card numbers;
      input the transaction data into an encoder that performs linear transformations and nonlinear transformations and encodes the transaction data to lower dimensionality latent space data, with each latent space point being associated with one credit card number, wherein—
         the encoder comprises an artificial neural network (ANN) including a plurality of layers, each of the plurality of layers comprising one or more nodes,
         an input layer of the plurality of layers takes the transaction data as input and each of the remaining plurality of layers takes output of a preceding one of the plurality of layers as input,
         each of the successive plurality of layers has a lower number of nodes than the preceding one of the plurality of layers,
         the encoder performs linear transformations of the transaction data according to $h=\sigma(Wx+b)$, wherein h is linear data of the latent space data, $\sigma$ is an element-wise activation function, W is a weight matrix, b is a bias vector, and x is the transaction data,
         the encoder performs nonlinear transformations of the transaction data according to a nonlinear function $f(xi)$;
      input the latent space data into a clustering element including a K-means clustering algorithm to generate a virtual plot including a plurality of clusters, wherein each credit card number is associated with one of the plurality of clusters;
      input the latent space data into a decoder that performs linear transformations and nonlinear transformations and increases dimensionality of the latent space data to produce reconstructed transaction data, wherein—
the decoder comprises an ANN including a plurality of layers, each of the plurality of layers of the decoder ANN comprising one or more decoder ANN nodes,
an input layer of the plurality of layers of the decoder ANN takes the latent space data as input and each of the remaining plurality of layers of the decoder ANN takes output of a preceding one of the plurality of layers of the decoder ANN as input,
each of the successive plurality of layers of the decoder ANN has a higher number of nodes than the preceding one of the plurality of layers of the decoder ANN,
the decoder performs linear transformations of the latent space data according to x'=σ'(W'h+b'), wherein x' is the reconstructed transaction data, h is the linear latent space data, σ' is a second element-wise activation function, W' is a second weight matrix, and b is a second bias vector,
the decoder performs nonlinear transformations of the latent space data according to a nonlinear function g(f(xi)), with g(f(xi)) being an inverse of the nonlinear function f(xi);
train the encoder and decoder to minimize reconstruction loss in the reconstructed transaction data, with the reconstruction loss being a difference between the reconstructed transaction data and the transaction data input into the encoder, wherein—
the training of the encoder and the decoder includes modifying one or more weights of the one or more nodes of the encoder and decoder to minimize the reconstruction loss in the reconstructed transaction data according to the following equation—

$$\min \left( \sum_1^N (l(g(f(xi)), xi) + \|X - WH\|) + \sum_1^m \frac{\lambda}{2} \|\mu(xi) - Msi\|_2^2 + r1(H) + r2(W) \right)$$

wherein l(g (f (xi)), xi) is nonlinear reconstruction loss, X−WH is linear reconstruction loss, r1(H) and r2(W) are regularizing terms, and μ(xi)−Msi is clustering loss, with μ(xi) being a concatenation of f(xi) and H, and with f(xi) representing output data of the nonlinear transformations of the encoder and H representing output data of the linear transformations of the encoder, perform K-means clustering to minimize clustering loss;
based on the retraining to minimize reconstruction loss and on the minimization of clustering loss, adjust a location of at least some of the plurality of credit card numbers in the virtual plot using the encoder and the K-means clustering algorithm; and
based on the adjusted virtual plot, make an upgrade offer to one or more of the plurality of credit card numbers that have a normal credit status and which are associated with clusters that also include credit card numbers of the plurality of credit card numbers that have a preferred credit status.

2. A computer-implemented method for analyzing data from user spending patterns to determine offers to be presented to credit card customers, the method comprising:
receiving transaction data for a plurality of transactions for each of a plurality of credit card numbers;
inputting the transaction data into an encoder that performs linear transformations and nonlinear transformations and encodes the transaction data to lower dimensionality latent space data, with each latent space point being associated with one credit card number, wherein—
the encoder comprises an artificial neural network (ANN) including a plurality of layers, each of the plurality of layers comprising one or more nodes,
an input layer of the plurality of layers takes the transaction data as input and each of the remaining plurality of layers takes output of a preceding one of the plurality of layers as input,
each of the successive plurality of layers has a lower number of nodes than the preceding one of the plurality of layers,
the encoder performs linear transformations of the transaction data according to h=σ(Wx+b), wherein h is linear data of the latent space data, σ is an element-wise activation function, W is a weight matrix, b is a bias vector, and x is the transaction data,
the encoder performs nonlinear transformations of the transaction data according to a nonlinear function f(xi);
inputting the latent space data into a clustering element including a K-means clustering algorithm to generate a virtual plot including a plurality of clusters, wherein each credit card number is associated with one of the plurality of clusters;
inputting the latent space data into a decoder that performs linear transformations and nonlinear transformations and increases dimensionality of the latent space data to produce reconstructed transaction data, wherein—
the decoder comprises an ANN including a plurality of layers, each of the plurality of layers of the decoder ANN comprising one or more decoder ANN nodes,
an input layer of the plurality of layers of the decoder ANN takes the latent space data as input and each of the remaining plurality of layers of the decoder ANN takes output of a preceding one of the plurality of layers of the decoder ANN as input,
each of the successive plurality of layers of the decoder ANN has a higher number of nodes than the preceding one of the plurality of layers of the decoder ANN,
the decoder performs linear transformations of the latent space data according to x'=σ'(W'h+b'), wherein x' is the reconstructed transaction data, h is the linear latent space data, σ' is a second element-wise activation function, W' is a second weight matrix, and b is a second bias vector,
the decoder performs nonlinear transformations of the latent space data according to a nonlinear function g(f(xi)), with g(f(xi)) being an inverse of the nonlinear function f (xi);
training the encoder and decoder to minimize reconstruction loss in the reconstructed transaction data, with the reconstruction loss being a difference between the reconstructed transaction data and the transaction data input into the encoder, wherein—
the training of the encoder and the decoder includes modifying one or more weights of the one or more nodes of the encoder and decoder to minimize the reconstruction loss in the reconstructed transaction data according to the following equation—

$$\min \left( \sum_1^N (l(g(f(xi)), xi) + \|X - WH\|) + \sum_1^m \frac{\lambda}{2} \|\mu(xi) - Msi\|_2^2 + r1(H) + r2(W) \right)$$

wherein l(g(f(xi)), xi) is nonlinear reconstruction loss, X−WH is linear reconstruction loss, r1(H) and r2(W) are regularizing terms, and μ(xi)−Msi is clustering loss, with μ(xi) being a concatenation of f(xi) and H, and with f(xi) representing output data of the nonlinear transformations of the encoder and H representing output data of the linear transformations of the encoder;

performing K-means clustering to minimize clustering loss;

based on the retraining to minimize reconstruction loss and on the minimization of clustering loss, adjusting a location of at least some of the plurality of credit card numbers in the virtual plot using the encoder and the K-means clustering algorithm; and based on the adjusted virtual plot, making an upgrade offer to one or more of the plurality of credit card numbers that have a normal credit status and which are associated with clusters that also include credit card numbers of the plurality of credit card numbers that have a preferred credit status.

3. A non-transitory computer readable medium having stored thereon software instructions for analyzing data from user spending patterns to determine offers to be presented to credit card customers that, when executed by a processing element, cause the processing element to:

receive transaction data for a plurality of transactions for each of a plurality of credit card numbers;

input the transaction data into an encoder that performs linear transformations and nonlinear transformations and encodes the transaction data to lower dimensionality latent space data, with each latent space point being associated with one credit card number, wherein— the encoder comprises an artificial neural network (ANN) including a plurality of layers, each of the plurality of layers comprising one or more nodes, an input layer of the plurality of layers takes the transaction data as input and each of the remaining plurality of layers takes output of a preceding one of the plurality of layers as input, each of the successive plurality of layers has a lower number of nodes than the preceding one of the plurality of layers, the encoder performs linear transformations of the transaction data according to h=σ(Wx+b), wherein h is linear data of the latent space data, σ is an element-wise activation function, W is a weight matrix, b is a bias vector, and x is the transaction data, the encoder performs nonlinear transformations of the transaction data according to a nonlinear function f(xi);

input the latent space data into a clustering element including a K-means clustering algorithm to generate a virtual plot including a plurality of clusters, wherein each credit card number is associated with one of the plurality of clusters;

input the latent space data into a decoder that performs linear transformations and nonlinear transformations and increases dimensionality of the latent space data to produce reconstructed transaction data, wherein— the decoder comprises an ANN including a plurality of layers, each of the plurality of layers of the decoder ANN comprising one or more decoder ANN nodes, an input layer of the plurality of layers of the decoder ANN takes the latent space data as input and each of the remaining plurality of layers of the decoder ANN takes output of a preceding one of the plurality of layers of the decoder ANN as input, each of the successive plurality of layers of the decoder ANN has a higher number of nodes than the preceding one of the plurality of layers of the decoder ANN, the decoder performs linear transformations of the latent space data according to x'=σ'(W'h+b'), wherein x' is the reconstructed transaction data, h is the linear latent space data, σ' is a second element-wise activation function, W' is a second weight matrix, and b is a second bias vector, the decoder performs nonlinear transformations of the latent space data according to a nonlinear function g(f(xi)), with g(f(xi)) being an inverse of the nonlinear function f(xi);

train the encoder and decoder to minimize reconstruction loss in the reconstructed transaction data, with the reconstruction loss being a difference between the reconstructed transaction data and the transaction data input into the encoder, wherein— the training of the encoder and the decoder includes modifying one or more weights of the one or more nodes of the encoder and decoder to minimize the reconstruction loss in the reconstructed transaction data according to the following equation—

$$\min \left( \sum_1^N (l(g(f(xi)), xi) + \|X - WH\|) + \sum_1^m \frac{\lambda}{2} \|\mu(xi) - Msi\|_2^2 + r1(H) + r2(W) \right)$$

wherein l(g(f(xi)), xi) is nonlinear reconstruction loss, X−WH is linear reconstruction loss, r1(H) and r2(W) are regularizing terms, and μ(xi)−Msi is clustering loss, with μ(xi) being a concatenation of f(xi) and H, and with f(xi) representing output data of the nonlinear transformations of the encoder and H representing output data of the linear transformations of the encoder;

perform K-means clustering to minimize clustering loss;

based on the retraining to minimize reconstruction loss and on the minimization of clustering loss, adjust a location of at least some of the plurality of credit card numbers in the virtual plot using the encoder and the K-means clustering algorithm; and based on the adjusted virtual plot, make an upgrade offer to one or more of the plurality of credit card numbers that have a normal credit status and which are associated with clusters that also include credit card numbers of the plurality of credit card numbers that have a preferred credit status.

\* \* \* \* \*